Nov. 3, 1964  A. P. BEILER  3,155,226
BALE CONVEYOR

Filed Oct. 31, 1962  2 Sheets-Sheet 1

INVENTOR.
AARON P. BEILER

Nov. 3, 1964    A. P. BEILER    3,155,226
BALE CONVEYOR

Filed Oct. 31, 1962    2 Sheets-Sheet 2

INVENTOR.
AARON P. BEILER
BY

AGENT

United States Patent Office 3,155,226
Patented Nov. 3, 1964

3,155,226
BALE CONVEYOR
Aaron P. Beiler, Gap, Pa., assignor to Sperry Rand Corporation, New Holland, Pa., a corporation of Delaware
Filed Oct. 31, 1962, Ser. No. 234,431
2 Claims. (Cl. 198—182)

This invention relates to an apparatus for conveying bales of hay and the like. More specifically, this invention relates to apparatus for conveying bales of hay and the like around a right angle curve.

Mow-conveyor systems to carry bales of hay and the like from the ground into the storage mow of a barn are well known. These conveyor systems must be as maintenance free and jam-proof in operation as possible, since they operate high in the air just under the barn roof and are relatively inaccessible for repairs or clearing in the event they fail mechanically or become jammed. Jamming of the conveyor system most commonly occurs at a point where the bale is conveyed around a right angle turn. The turning operation involves discharging a bale from the end of an elevator, or a first conveyor, over the side of and into a second conveyor traveling at right angles to the first conveyor, or elevator. Various guide rails and plates are employed at the juncture of the two converyors in an effort to deflect the bale onto the second conveyor in the proper position to be picked up by the conveyor chain of the second conveyor. This amounts to driving the bale in one direction while attempting to "cam" the bale into a certain position at right angles to the direction of drive while transferring the bale from one conveyor to another. This is a power consuming operation. The problem is complicated by the physical nature of a bale. When driven against a cam surface, or rail, the bale yields and deflects to some extent, and the extent of yield and deflection varies from bale to bale. Thus, control over the bale is not as exact and positive as would be desired. Modern hay balers are provided with adjustments which enable a farmer to selectively make bales from around one foot in length to around four feet in length. This additional variable further complicates the task of manufacturing dependably jam-proof mechanism which will convey a bale around a right angle turn.

In any conveyor system, all right angle turns are avoided wherever possible. When a turn is unavoidable, the joining conveyors and guide members are set up and adjusted on a more or less custom basis for each turn. This materially increases the complexity of installation as well as the time required for installation of a given conveyor system, and it still does not insure against jamming under all the possible variable conditions that may be encountered in normal operation.

If the problem were limited to merely the provision of mechanism which would convey a bale around a right angle turn, many solutions would be readily available. The problem, however, is to provide structure which will be dependable in operation while being light enough to be readily installed high in the air under a barn roof and which at the same time can be manufactured at sufficiently low cost to justify its purchase for the limited function for which it is intended.

It is an object of this invention to provide conveyor structure which will gently support and positively convey a bale of hay or the like around a right angle turn.

It is another object of this invention to provide a bale turning conveyor unit which will handle all the known sizes and shapes of bales without adjustment.

It is another object of this invention to provide a bale turning conveyor unit which is completely jam-proof in operation.

It is another object of this invention to provide a bale turning device for a mow-conveyor which may be easily attached to the mow-conveyor as a unit.

It is another object of this invention to provide a single bale turning unit which is selectively operable to convey bales around a ninety degree turn to the right or the left.

It is another object of this invention to provide a bale turning device which is of rugged construction, mechanically simple, light in weight, and low in cost.

These and other objects and advantages of this invention will be apparent upon reference to the following specification and claims taken in conjunction with the accompanying drawings wherein:

Figure 2:
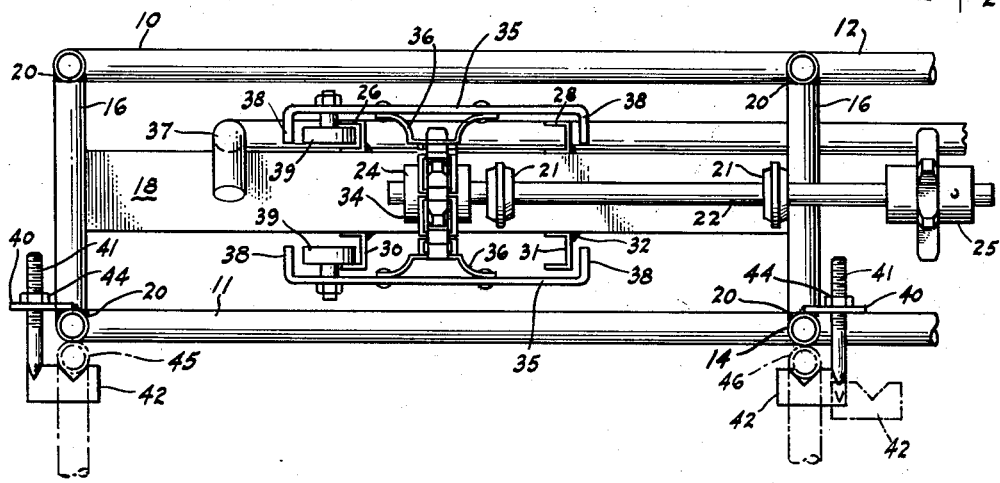
FIG. 2 is an enlarged fragmentary view looking at one end of the turning unit as indicated by the line 2—2 in FIG. 1 and showing how the turning unit is attached to the guide rails of a mow-conveyor.
Figure 3:
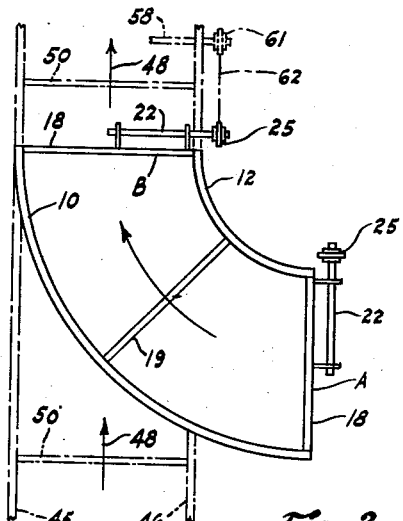
Figure 4:
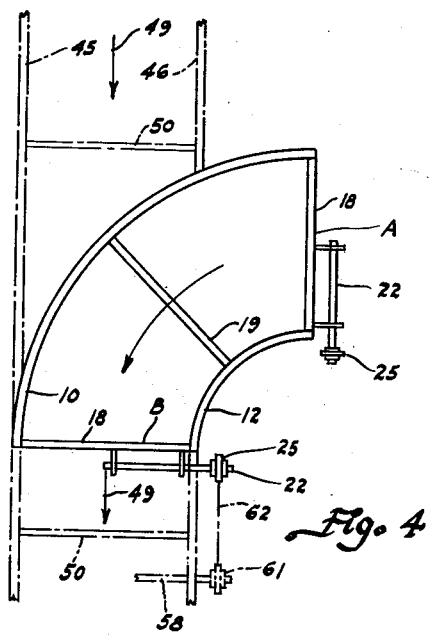
Figure 5:
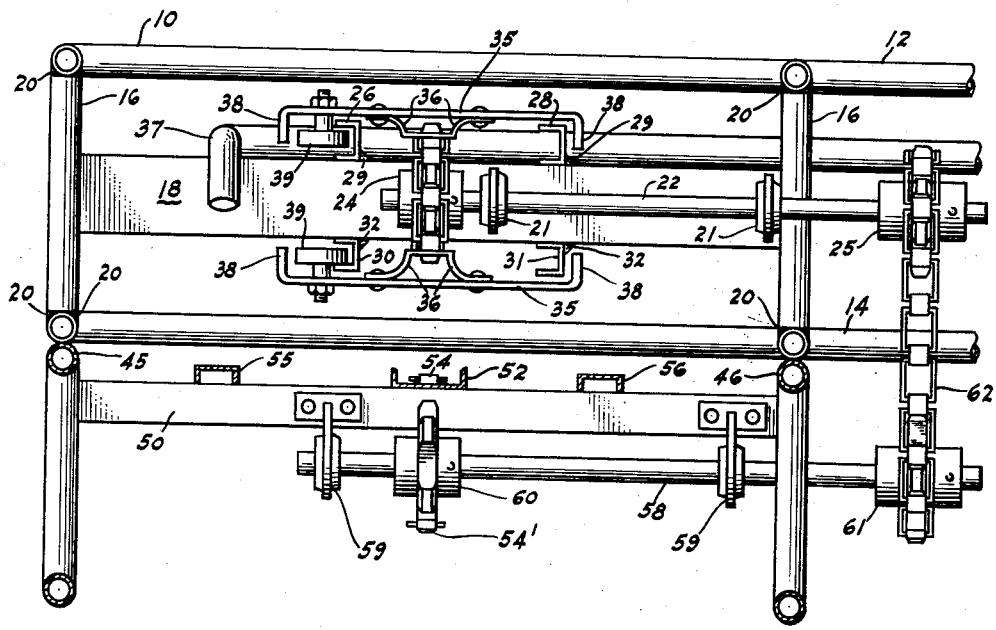

FIGS. 3 and 4 are diagrammatic plan views showing, respectively, how the turning device may be selectively mounted on and driven from a mow-conveyor to deliver bales around a right turn or a left turn onto the conveyor; and FIG. 5 is a fragmentary end view similar to FIG. 2 showing how the device is driven from the return run of the mow-conveyor on which it is mounted. The clamping means for attaching the turning device to the mow-conveyor are omitted in this view.

Figure 1:
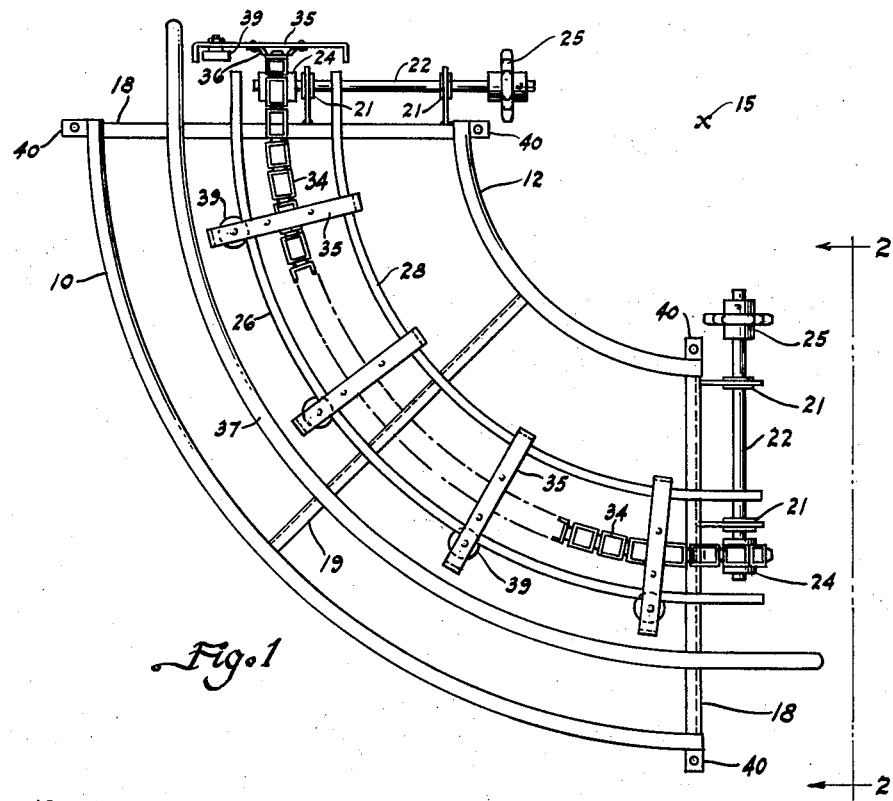
FIG. 1 is a plan view of a mow-conveyor turning unit constructed in accordance with the principles of this invention.

Referring now to the drawings in detail: the turning device of this invention comprises an arcuate frame structure having upper and lower outside side rails 10 and 11, respectively, and upper and lower inside side rails 12 and 14, respectively. The rails are all parallel and of ninety degree arcuate extent. The spacing between the outside and inside side rails is identical to the lateral spacing between the side rails of a standard, straight mow-conveyor section as may be seen in FIGS. 2–5. The center of curvature of the upper rails 10 and 12 is shown in FIG. 1 at 15. The upper and lower side rails are spaced apart vertically by a plurality of spacer members 16 which may be seen in FIGS. 2 and 5. The side rails and vertical spacer members are all preferably of tubular steel for a combination of high strength and light weight. At each end of the arcuate frame structure is a horizontal end member 18 of channel-shaped cross section. A similar channel shaped brace member 19 may be provided in the center of the arcuate structure. As may be seen in FIGS. 2 and 5, the interconnection of the various frame members is preferably by welding as indicated by the numeral 20.

On each of the end members 18 is rigidly mounted a pair of pillow blocks 21 (see FIG. 1). Each pair of pillow blocks 21 journals a shaft 22 having two identical sprockets 24 and 25 fixedly mounted thereon at the respective ends of each shaft. The two sprockets 24 are disposed substantially midway between the arcuate side rails of the frame, while the two sprockets 25 are disposed outside of the frame structure on the concave side thereof. It is best seen in FIG. 1 that the longitudinal axes of the two shafts 22 (and hence the axes of rotation of the various sprockets) intersect each other at a right angle in the vicinity of the center of curvature 15 of the frame in general.

A pair of elongated arcuate guide rails 26 and 28 of channel shaped cross section are supported on the upper edges of the frame end members 18 and on the upper edge of the central horizontal channel brace member 19. The guide rails 26 and 28 are of ninety degree arcuate extent. They are parallel to and spaced from the side frame rails 10 and 12 and they are spaced from each other. The guide rails 26 and 28 are anchored to the frame end members 18 and to the horizontal center member 19 by welding as may be seen in FIGS. 2 and 5 at 29. An identical pair of guide rails 30 and 31 are welded to the under-sides of frame members 18 as may be seen at 32 in FIGS. 2 and 5.

The relationship between the guide rails 26, 28, 30 and 31 and the two respective end sprockets 24 is simply that the sprockets are disposed substantially midway between the guide rails.

Entrained around the two end sprockets 24 is an endless chain 34 having a feed run extending between the sprockets on the upper side of the end members 18 and the horizontal brace 19 and having a return run extending between the two sprockets 24 on the under side of the frame end members 18 and the horizontal center member 19. The feed run of chain 34 lies between upper guide rails 26 and 28 while the return run of chain 34 lies between lower guide rails 30 and 31.

The chain 34 is of the type known as detachable link chains. This is the same type of chain commonly used on straight-line bale conveyor sections. The chain 34 rigidly carries a plurality of cross bars 35 spaced along the length of the chain. Each cross bar 35 is rigidly carried on a single special chain link which has upstanding side flanges 36, as may be best seen in FIGS. 2 and 5. The crossbars 35 are disposed perpendicularly to the direction of travel of the chain and they are of greater length than the radial spacing between the guide rails 26 and 28 and 30 and 31. Each crossbar 35 has a flange 38 at each end thereof. The flanges 38 are disposed so as to be down turned on the feed run and up turned on the return run of the chain. Each of the crossbars 35 rotatably carries a roller 39. The chain is entrained about the two sprockets 24 with the rollers 39 disposed between the flanges of the channel shaped guide rail 26 along the feed run and between the flanges of the channel shaped guide rail 30 along the return run. The flanges 38 on the ends of the cross bars 35 remote from the rollers 39 hook over the guide rails 28 and 31 on the feed run and return run, respectively. The clearance, or play, between the links of the chain 34 is utilized to curve the chain in a ninety degree horizontal arc between the two sprockets 24. As may be seen in FIGS. 2 and 5, the clearance between the flanges 38 of bars 35 and the guide rails 28 and 31 is liberal, as is the clearance between rollers 39 and the guide rails 26 and 30. This allows the loose connections between the individual links of the chain 34 to yield and flex readily to prevent binding as the chain travels around its circuitous path. However, the horizontal radial distance between guide tracks 26 and 28 and guide tracks 30 and 31 must be so related to the horizontal radial distance between the rollers 39 and the downturned flanges 38 on the remote ends of crossbars 35 that the flanges 38 will engage guide rails 28 or 31 before the rollers 39 can move outwardly from between the flanges of guide tracks 26 and 30. This prevents the chain from raising up and assuming a straight line between the two sprockets 24 when in operation.

As best seen in FIG. 1, a ninety degree arcuate support rail 37 is preferably provided between guide rail 26 and side rail 10. This rail prevents the corners of small bales from engaging the end members 18 or the center brace 19.

At each of the four lower corners of the frame structure is welded an apertured bracket 40. A threaded rod 41 (see FIG. 2) extends vertically through the aperture in each of the brackets 40. A notched plate 42 is carried on the lower end of each of the threaded rods 41. A nut 44 is threaded on each of the rods 41 above the brackets 40. This provides releasable clamping means by which the bale turning device, shown alone in FIG. 1, may be attached to the longitudinal guide rails of a straight mow-conveyor section. In FIG. 2, the longitudinal side rails 45 and 46 of a mow-conveyor are shown in phantom along with portions of the vertical supporting members for the side rails.

It will be apparent from FIG. 1 that the turning device is symmetrical about a vertical plane through the horizontal center brace member 19. In the diagrammatic views of FIGS. 3 and 4, the longitudinal side rails 45 and 46 of a horizontal straight mow-conveyor section are indicated along with the direction of travel of the feed run of the straight conveyor section. The direction of feed of the straight conveyor section is indicated by the arrows 48 and 49 in FIGS. 3 and 4, respectively. It will be seen in FIGS. 3 and 4 that either end of the turning device may be attached to a straight conveyor section with that end of the device facing in the direction of feed of the conveyor. The one end of the turning device is mounted on the straight conveyor if it is desired to feed from the right side of the straight conveyor, relative to the direction of travel of the conveyor; and the other end of the turning device is mounted on the straight conveyor if it is desired to feed onto the straight conveyor from the left side thereof relative to the direction of feed of the conveyor. These are the two arrangements shown respectively in FIGS. 3 and 4. In either case, the remaining end of the turning device extends at a right angle to the horizontal straight conveyor.

Either one of the two sprockets 25 may serve as the driving means for the turning device. The driving power for the turning device is preferably derived from the return run of the conveyor chain of the straight conveyor section to which the turning device is feeding. In FIG. 5, the entire straight horizontal conveyor section is shown in supporting relation to the turning device. The upper side guide rails 45 and 46 have been previously described. In addition to these members, the mow-conveyor comprises horizontal transverse supports 50 at spaced intervals along the length of the conveyor. On the upper edge of the transverse support members 50 is a longitudinally extending channel member 52 disposed midway between side rails 45 and 46. Channel member 52 serves as a guide track for the detachable link chain 54. At spaced intervals along the length of the conveyor chain 54 are bale pusher lugs, not shown, which engage the end of a bale resting on longitudinal support rails 55 and 56 and slide the bale along the rails. The conveyor chain 54 of the mow-conveyor has a return run which is shown in FIG. 5 at 54'. A drive shaft 58 is journalled in a pair of pillow blocks 59 which may be bolted, or otherwise attached, to a cross brace member 50 of the mow-conveyor. The shaft 58 carries two sprockets 60 and 61 of the same type and size as sprockets 24 and 25 of the turning device. As seen in FIG. 5, the sprocket 60 engages the return run 54' of the mow-conveyor chain 54 and is driven thereby. This rotates shaft 58 in pillow blocks 59, thus driving sprocket 61 on the other end of shaft 58. A short loop of endless detachable link chain 62 is entrained about sprocket 61 and the adjacent sprocket 25 of the bale turning device to drive the turning device from the supporting mow-conveyor.

In FIGS. 3 and 4 it will be apparent that a bale delivered to the end of the turning device marked A will be supported on the crossbars 35, carried thereby around a ninety degree bend and discharged from the end of the turning device marked B onto the mow-conveyor in position to be engaged and carried away by the next approaching set of pusher lugs on the mow-conveyor chain.

The above described bale turning mechanism positively supports and carries bales around right angle turns and deposits them squarely onto the conveyor which is to receive them. This is accomplished without the use of bevel drive gears or other expensive right angle power transferring means. The turning device is light in weight, yet rugged, jam proof, and maintenance free in operation. It is quickly and easily attached in operating alignment to a mow-conveyor section. Driving connection to the supporting conveyor is easily established. The manufacture of one standard unit serves for both right and left hand turns.

While in most installations mow-conveyors operate in a horizontal plane, they are not infrequently operated at a gentle incline. This does not prohibit the use of the turning device of this invention. Thus, the terms horizontal and vertical, as employed herein, refer to the turning device in its most common position of operation; but not in its only operative position.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In combination with a mow conveyor for bales of hay or the like having sides and means to feed bales in a predetermined direction between said sides, a device for feeding bales of hay or the like onto said mow conveyor from a direction substantially perpendicular to the direction of feed of said mow conveyor, said device comprising a frame having elongated parallel side rails spaced apart the width of said mow conveyor and interconnected at the respective ends thereof by end members, said side rails being curved in a ninety degree arc between said end members, a pair of arcuate guide rails disposed between said side rails and having their respective ends mounted on said end frame members, said guide rails being parallel with said side rails and spaced from the side rails and from each other, a first shaft having a sprocket mounted thereon, a second shaft having a sprocket mounted thereon, means mounting said first shaft on one of said end members for rotation about its own axis and with its sprocket disposed substantially midway between said guide rails, means mounting said second shaft on the other of said end members for rotation about its own axis and with its sprocket disposed substantially midway between said guide rails, an endless detachable link chain entrained around said sprockets and extending therebetween in an upper feed run and a lower return run, a plurality of bale supporting bars carried by said chain and spaced along the length thereof, said bars extending generally perpendicular to said chain and said guide rails and being greater in length than the shortest distance between said guide rails, means at each end of each of said bale supporting bars engageable with the respective guide rails to guide said chain in a ninety degree arcuate path parallel to and disposed between said guide rails as said chain moves said bars along said feed run in travelling from one of said sprockets to the other, means on said frame for selectively attaching the frame to said mow conveyor with either end portion of said frame side rails overlying the sides of the mow conveyor and extending parallel thereto and the other end portion of said frame side rails extending perpendicularly to one or the other sides of the mow conveyor, and means connecting the shaft at the end of said frame overlying said mow conveyor to the mow conveyor feed means to be driven thereby, whereby said frame may be selectively mounted on said mow conveyor to receive bales delivered perpendicular to the mow conveyor from either side thereof and turn and deliver said bales onto said mow conveyor in the direction of feed of the mow conveyor.

2. In combination with a mow conveyor for bales of hay or the like having longitudinal side rails and means to feed bales in a predetermined direction between said side rails, a device for feeding bales of hay or the like onto said mow conveyor from a direction substantially perpendicular to the direction of feed of said mow conveyor, said device comprising a frame having elongated parallel side rails spaced apart the width of said mow conveyor side rails and interconnected at the respective ends thereof by end members, said side rails being curved in a ninety degree arc between said end members, a first horizontally disposed shaft journalled on one of said end members, a second horizontally disposed shaft journalled on the other of said end members, said shafts each projecting laterally beyond one of said arcuate side rails, a pair of sprockets journalled on each of said shafts, one sprocket on each of said shafts being disposed substantially midway between said arcuate side rails, the other sprocket on each of said shafts being disposed laterally beyond one of said arcuate side rails, an endless chain entrained around said one sprocket on each of said shafts, a plurality of bale supporting members carried by said chain and spaced along the length thereof, arcuate guide means on said frame engageable with each of said bale supporting members to guide said chain through a ninety degree arcuate path in travelling from one of said sprockets to the other, means on said frame for selectively attaching the frame to a mow conveyor with either one of said shafts overlying the mow conveyor and extending perpendicular to the direction of feed of the mow conveyor and the other of said shafts disposed to one side of the mow conveyor and extending parallel to the direction of feed of the mow conveyor, and means drivingly connecting said other sprocket on said one shaft to said mow conveyor feed means to be driven thereby, whereby said frame may be selectively mounted on a mow conveyor to receive bales delivered perpendicular to the mow conveyor from either side thereof and turn and deliver said bales onto said mow conveyor in the direction of feed of the mow conveyor.

References Cited by the Examiner

UNITED STATES PATENTS

| 2,169,424 | 8/39 | Levin | 262—28 |
|---|---|---|---|
| 2,306,431 | 12/42 | Exley | 198—182 |
| 2,652,143 | 9/53 | Van Doren | 198—181 |
| 2,855,091 | 10/58 | Frandsen | 198—181 |
| 3,044,603 | 7/62 | Fry | 198—182 |

SAMUEL McCANNON, Acting Primary Examiner.

ERNEST A. FALLER, JR., WILLIAM B. LA BORDE, Examiners.